United States Patent
Pelland et al.

(10) Patent No.: US 11,769,151 B2
(45) Date of Patent: Sep. 26, 2023

(54) METHODS AND SYSTEMS FOR RATE-LIMITING CONTROL OF TRANSACTION PROCESSING

(71) Applicant: Shopify Inc., Ottawa (CA)

(72) Inventors: Francis Pelland, Pickering (CA); Devon Meunier, Guelph (CA); Dennis Ho, Rockcliffe (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/547,316

(22) Filed: Dec. 10, 2021

(65) Prior Publication Data

US 2023/0186303 A1    Jun. 15, 2023

(51) Int. Cl.
*G06Q 20/40* (2012.01)

(52) U.S. Cl.
CPC .................. *G06Q 20/401* (2013.01)

(58) Field of Classification Search
CPC .................................................. G06Q 20/401
See application file for complete search history.

(56) References Cited

U.S. PATENT DOCUMENTS

| | | | | |
|---|---|---|---|---|
| 2018/0005226 A1* | 1/2018 | Terra | ................. | G06K 7/0004 |
| 2021/0042722 A1* | 2/2021 | Wolter | ............... | G06Q 20/202 |
| 2021/0124616 A1* | 4/2021 | Verma | ............... | G06Q 30/0601 |
| 2022/0308977 A1* | 9/2022 | Slinger | ............... | G06F 11/3428 |

OTHER PUBLICATIONS

"Zuora Increases Payment Processing Throughput 100x," Zuora, dated Jul. 30, 2020 https://www.zuora.com/2020/07/30/zuora-increases-payment-processing-throughput-100x/ (Year: 2020).*

"How many transactions per second should the white label payment gateway platform handle?" BeGateway, dated Sep. 26, 2020 https://web.archive.org/web/20200926203552/https://begateway.com/white-label-payment-gateway-throughput/ (hereinafter "BeGateway") (Year: 2020).*

H V Ramachandra, "Machine Learning Application for Black Friday Sales Prediction Framework" IEEE, dated Apr. 9, 2021 https://ieeexplore.ieee.org/stamp/stamp.jsp?tp=&arnumber=9396994 (Year: 2021).*

* cited by examiner

*Primary Examiner* — Gregory S Cunningham, II
*Assistant Examiner* — Raven E Yono
(74) *Attorney, Agent, or Firm* — Rowand LLP

(57) ABSTRACT

A computer-implemented system and method of dynamically switching between a full checkout process and a partial checkout process based on a payment processor load condition. An e-commerce platform may receive checkout requests in connection with a merchant account and may complete, for each of at least one of the checkout requests, an authorization operation and a capture operation via a payment processor. If the platform detects a first payment throughput limit event with regard to the payment processor then it completes a respective authorization operation for each new checkout request, and delays a respective capture operation for the new checkout request until after a second payment throughput limit event is detected.

23 Claims, 7 Drawing Sheets

FIG. 8

METHODS AND SYSTEMS FOR RATE-LIMITING CONTROL OF TRANSACTION PROCESSING

TECHNICAL FIELD

The present disclosure relates to computer-implemented transaction processing in a throughput-limited/rate-limited context and, in particular, to methods and systems for dynamically altering the transaction processing operations based on detection of a throughput limit event.

BACKGROUND

Transaction processing systems can experience high load conditions during which a large number of transactions are to be processed. Such platforms may communicate with external systems in order to process those transactions. Sometimes this can result in failed transactions under load.

For example, e-commerce platforms, whether for single merchants or multiple merchants, can experience high load conditions during which a large number of payment requests are to be processed. Such platforms typically rely on third-party payment processors to carry out the computing operations to securely and properly process payments. Sometimes, the high load condition can result in failed payment requests because the volume or rate of payment requests exceeds a payment throughput limit at the payment processor.

It would be advantageous to provide for systems and methods of processing transactions that improve throughput while reducing the likelihood of failed operations due to payment throughput/capacity limits of external systems.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
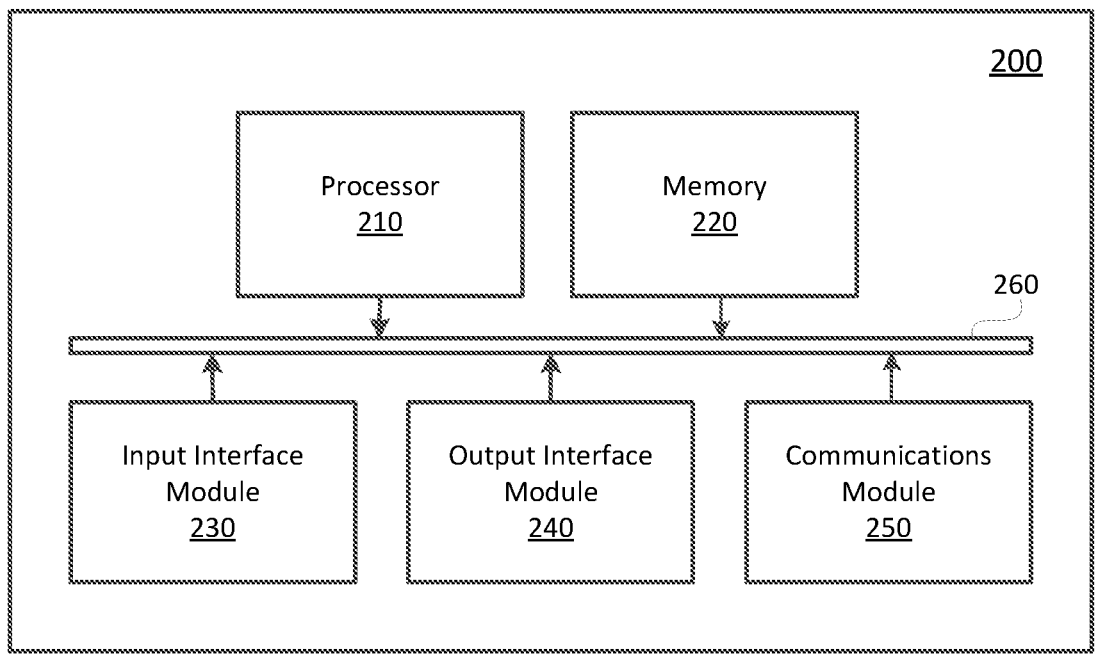
FIG. 1 is a high-level schematic diagram of a computing device.

Transaction processing systems can experience high load conditions during which a large number of transactions are to be processed. Such platforms may communicate with external systems in order to process those transactions. Sometimes this can result in failed transactions under load.

The present application provides systems and methods for transaction processing at a platform that relies on external transaction processors. Each transaction may involve two processing operations at the external systems. The systems and methods described herein dynamically switch between full transaction processing and partial transaction processing. That is, when the platform detects a first transaction limit or state of congestion it triggers completion of only a portion of the transaction, e.g. a first of the processing operations, and delays completion of the remainder of the transaction, e.g. a later one of the processing operations, for all new transaction requests. The remainder of the transaction for each new transaction request is then completed after a second transaction limit or state of congestion is detected, signalling that the platform may switch back to full transaction processing.

One illustrative example of a platform that relies on external processors of transaction requests is an e-commerce platform that relies on external payment processors. Some of the embodiments and examples systems will be described in the content of an e-commerce platform; however, the present application is not necessarily limited to e-commerce platforms and external payment processors. The present system and method may be applied in the context of any platform that relies on external third party systems to process multi-stage or multi-step transaction requests and that may experience transaction delays or failures under heavy load conditions.

In one aspect, the present application discloses a computer-implemented method that includes receiving checkout requests in connection with a merchant account; completing, for each of at least one of the checkout requests, an authorization operation and a capture operation via a payment processor; detecting a first payment throughput limit event with regard to the payment processor; and, responsive to the first payment throughput limit event, completing a respective authorization operation for each new checkout request, and delaying a respective capture operation for the new checkout request until after a second payment throughput limit event is detected.

In some implementations, completing the authorization operation and the capture operation via the payment processor includes completing a full checkout process, and wherein completing the respective authorization operation and delaying the respective capture operation includes completing a partial checkout process.

In some implementations, detecting the first payment throughput limit event includes determining that a projected rate of checkout requests exceeds a payment processor maximum rate.

In some implementations, detecting the first payment throughput limit event is based on one of a count of checkout requests received, a count of purchasers in a checkout phase, a count of authorization operations, a count of capture operations, a count of shopping carts associated with the merchant account, a rate of new purchasers entering the checkout phase, or a rate of growth in payment request volume with regard to the merchant account. In some cases, the method further includes determining a first payment throughput limit for the payment processor based on a stored history of measured checkout request rates during receipt of one or more payment failure messages from the payment processor.

In some implementations, completing the respective authorization operation includes causing a customer device to display a payment completion message in response to completion of the respective authorization operation and prior to completion of the respective capture operation.

In some implementations, detecting the first payment throughput limit event includes receiving a failure message from the payment processor.

In some implementations, completing the authorization operation and the capture operation, prior to detecting the first payment throughput limit event, comprises sending an authorization request to the payment processor, receiving an authorization approval message from the payment processor, sending a capture request message to the payment processor after receipt of the authorization approval message, and receiving a capture approval message from the payment processor. In some cases, completing the authorization operation and the capture operation, prior to detecting the first payment throughput limit event, further includes, responsive to receipt of the capture approval message, causing a respective customer device to display a payment completion message.

In some implementations, the method further includes determining that stored merchant data associated with the merchant account includes a partial checkout process authorization as a condition prior to delaying a respective capture operation for the new checkout request.

In some implementations, the method further includes detecting the second payment throughput limit event and, in response, reverting to completing the authorization operation and the capture operation for one or more subsequent checkout requests received.

In another aspect, the present application discloses a computing device having a processor and memory. The memory may store instructions that, when executed by the processor, cause the processor to carry out one of the methods or processes described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as the FACEBOOK SHOPS e-commerce platform offered by Meta Platforms, Inc. of Melno Park, Calif., the AMAZON e-commerce platform offered by Amazon.com, Inc. of Seattle, Wash., etc.

E-commerce typically involves a "checkout process" that includes, among other things, processing payment. As will be described further below in connection with an example e-commerce platform, a customer may log into the platform or application interface to the platform and place items in a virtual "shopping cart". Once ready to complete their purchase, the customer may request initiation of the checkout process.

In many cases, the e-commerce platform, whether a standalone store or a multi-merchant platform, does not process the payment itself, but instead the platform relies on one or more third-party payment processors. Multi-merchant platforms may interface with hundreds or thousands of payment processors. These payment processors may be of varying size and capacity. Some of the payment processors may be large international payment processors, while some may be dedicated to certain national or sub-national jurisdictions. In many cases, the payment processor may have a relationship with a certain financial institution or set of financial institutions for processing payments relating to accounts at those financial institutions. Some payment processors may be dedicated to certain debit or credit cards or other types of accounts or forms of payment. In some cases, a payment processor may exclude purchases relating to certain classes of goods that are considered too high risk (e.g. cannabis, firearms, cryptocurrency exchanges, etc.), whereas other payment processors may offer to process those payments, and may charge at a higher processing cost as a result.

The payment processors may have payment throughput limits. A payment throughput limit at a payment processor may be an overall physical limit (e.g. bandwidth/processing capacity limit) governing the number of concurrent requests or concurrent processing operations that the processor can service and/or a maximum rate of new payment requests that the processor is capable of servicing. In some cases, the payment throughput limit may be an artificial throttling imposed by the payment processor to protect its own hardware and software capacity by restricting the maximum rate of new requests or the total current number of requests being processed at any given time, while delaying, blocking, or refusing requests beyond that limit. The payment throughput limit may be payment processor wide, i.e. the total number of requests across all merchants and platforms being processed by the payment processor from any source. The payment throughput limit may be specific to an e-commerce platform, i.e. a maximum permitted number from a specific platform, or a maximum quantity of computing resources or bandwidth allocated to that platform. In some cases, the payment throughput limit may be merchant-specific, even if the merchant is selling goods/services via a multi-merchant e-commerce platform, i.e. a maximum allocated quantity of resources for that merchant in terms of bandwidth or capacity, or a throttled quantity of resources made available to that merchant on the basis of a contractual arrangement or service level agreement.

The processing of payments through a payment processor typically includes two separate operations. The first is an "authorization operation" in which the payment processor receives the payment details and verifies their authenticity and the availability of funds and/or credit, sometimes by way of external communications with an associated financial institution corresponding to the account details provided, and places a "reserve" or temporary "hold" on those funds. The second operation is a "capture operation" in which the payment processor causes the actual withdrawal or transfer of funds or consumption of credit to occur, typically based on external communications with the associated financial institution or other entity associated with the account involved in the payment. These operations are typically carried out based on a first API call, an "authorization API call", from the platform to the payment processor with payment details, in response to which the payment processor provides a confirmation or failure message. Assuming the authorization was confirmed, the platform then sends a second API call, a "capture API call", to the payment processor in response to which the payment process provides confirmation of payment (whether by credit or debit or otherwise) once the payment has occurred. The platform then provides a message regarding confirmation of the successful payment to the customer and the merchant.

In some cases, a merchant and a payment processor may permit a staged checkout in which only the authorization operation is performed and the capture operation is performed at a later time. This may be the case in, for example, some credit transactions where a pre-authorization is placed on the credit card to confirm availability of credit funds, and the actual capture occurs later. This may be the case, for example, at a gas station, a hotel, etc., in connection with goods/services for which a final price has not been determined but for which the merchant wishes to have pre-established authorization to charge a credit card having sufficient funds available to minimize risk of non-payment.

If a payment throughput limit is exceeded, one or more of the API calls to the payment processor may be refused, may time out, or may otherwise fail. When a failure message is received (or inferred from time out), the e-commerce platform may be configured to terminate the checkout process and provide notification of payment failure. In some cases, the platform may be configured to re-try after a short delay and hold the customer in an incomplete checkout process. In some cases, the platform may be configured to handle failures in some other manner.

In many instances, the capture operation may take longer than the authorization operation at the payment processor. Some payment processors may provide for a single API request/operation that triggers the payment processor to carry out both the authorization and capture operations, however the total processing time of that single API request may still exceed the processing time associated with the authorization operation alone.

Many merchants prefer to complete the full two-step payment transaction prior to providing confirmation of the completed transaction. If the payment processor has a limit (artificial or physical) on the number of concurrent payment requests or rate of payment requests (e.g. 30000 per minute), it may mean that the payment process can only process about 15000 completed payment transactions per minute (since each takes both an authorization request and a capture request). In some cases, the limit may account for both the authorization and capture requests such that 30000 payment transactions may be completed per minute, either because an authorization request and capture request are treated as one payment request, or because the payment processor permits both operations to be triggered by a single request. Even if the limit relates to completion of a full payment transaction (involving one request or two), the time to complete the full payment transaction may nevertheless impose a lower-than-maximum limit on capacity in the checkout phase since a prospective purchaser remains in the checkout process until the purchase transaction is completed, thereby preventing another purchaser from entering the checkout process if there is a maximum number of purchasers permitted in the checkout process at one time. If the payment throughput limit at the payment processor relates to a count of concurrent pending payment requests (whether based on one API request or two), the delay in full completion of a payment request including capture will leave pending requests in the active queue of payment requests longer, preventing new payment requests from being initiated.

Accordingly it may be advantageous to clear purchasers through the checkout process more quickly and/or to reduce the volume and processing time demands on the payment processor during high volume events, like flash sales.

The present application describes solutions for dynamic detection of a payment throughput limit event. The payment throughput limit event is a determination that the payment processor cannot process a current volume of payment requests from the e-commerce platform or will soon be unable or unlikely to process a volume of payment requests in the near future.

In accordance with some example embodiments, once the limit event is detected, the system switches from a full checkout process to a partial checkout process in which only the authorization operation is requested from the payment processor and the capture operation is queued for later processing. The system may monitor for a second payment throughput limit event indicative that the payment processor has sufficient capacity to process queued capture requests and/or that the flash sale or other request surge event has ended or is expected to have ended, and the platform may then revert to a full checkout process for subsequent checkout requests. In this context, a "full checkout process" refers to one in which the e-commerce platform requests both an authorization operation and a capture operation from a payment processor before providing payment confirmation to the customer and/or merchant and indicating that the checkout process is complete. Conversely, a "partial checkout process" refers to one in which the e-commerce platform only request the authorization operation from a payment processor before providing payment confirmation to the customer and/or merchant and indicating that the checkout process is complete, and in which the capture operation is queued for later handling once the platform detects a second payment throughput limit event indicative of available capacity at the payment processor.

In some illustrative examples, the first payment throughput limit event may be detected based on (a) receiving a refusal or failure message with regard to a payment request (e.g. authorization API call or capture API call) due to volume, (b) determining that a current count of payment requests (e.g. authorization operations and/or capture operations) is within a threshold percentage of a maximum volume, (c) determining that a count of shopping carts associated with a merchant account exceeds a maximum threshold, (d) determining that a count of customers in a checkout process or for which a checkout request has been received exceeds a threshold, (e) determining that a rate of growth in payment request count exceeds a maximum rate of growth. Combinations or sub-combinations of these examples may be used in some implementations, (f) detecting an increase in latency above a threshold level, or (g) metrics elsewhere in the platform, such as a count of internal database connections or a number of queued requests. More broadly, the first payment throughput limit event may be detected based on determining that a congestion metric, such as those examples above, has reached a state indicative of current or imminent congestion. The platform may be engaged in ongoing monitoring of the state of one or more congestion metrics for determining whether to switch from the full checkout process to the partial checkout process, and back again.

In some cases, detecting the first payment throughput limit event includes determining a projected rate of checkout requests and determining that the projected rate of checkout requests exceeds a payment processor maximum rate limit. For example, using one or more metrics like those outlined above, the e-commerce platform may determine a rate at which the count of concurrent payment requests is increasing and may project the total count at a future time, such as within 30 second or a minute for instance. In some cases, the e-commerce platform may determine from one or more metrics that the rate of increase is accelerating and may determine a projected future rate of payment requests. Other metrics or measurements for payment request volume or demand may be determined for assessing the likelihood that checkout requests will result in payment request demand that exceeds the first payment throughput limit of a particular payment processor.

The various maximum limits may be prescribed by the payment processor, set by the e-commerce platform, or may be based on historical data collected by the e-commerce platform regarding the capacity limit of that payment processor. Limits may be payment processor specific and stored in memory at the e-commerce platform.

The second limit event (or congestion state) may be detecting that one or more of the above parameters has fallen below a lower threshold indicating sufficient capacity to process captures and/or to switch back to full checkout process. The second payment throughput limit event may be a lower threshold than the first payment throughput limit to avoid frequent switching between full and partial checkout processing. In some cases, two different second payment throughput limits may be monitored: one for switching back to full checkout from partial checkout, and another for triggering processing of the queued capture operations.

The partial checkout process may permit clearing more purchasers through the checkout process than would otherwise be possible if the checkout process was not complete until the capture operation occurs, thereby improving the throughput of the e-commerce platform and avoiding the wasted bandwidth and processing associated with failed payment requests to the payment processor. In some cases, the partial checkout process may facilitate a higher rate of checkout process completions if the payment processor can accommodate (or permits) a higher rate of authorization operations than capture operations. Even in cases where a payment processor permits use of a single API request message to trigger both the authorization and capture operations, switching to just an authorization API request may (due to time consumed in completion of the capture operations) enable faster throughput of checkouts.

In some implementations, the e-commerce platform may retrieve merchant account parameters prior to switching to validate that the merchant account has enabled authorization-only checkouts under flash sale conditions.

FIG. 1 is a high-level operation diagram of an example computing device 200. The example computing device 200 includes a variety of modules. For example, the example computing device 200 may include a processor 210, a memory 220, an input interface module 230, an output interface module 240, and a communications module 250.

As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via WI-FI short-range communications protocol, via BLUETOOTH short-range communications protocol, or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of the memory 220.

Figure 2:
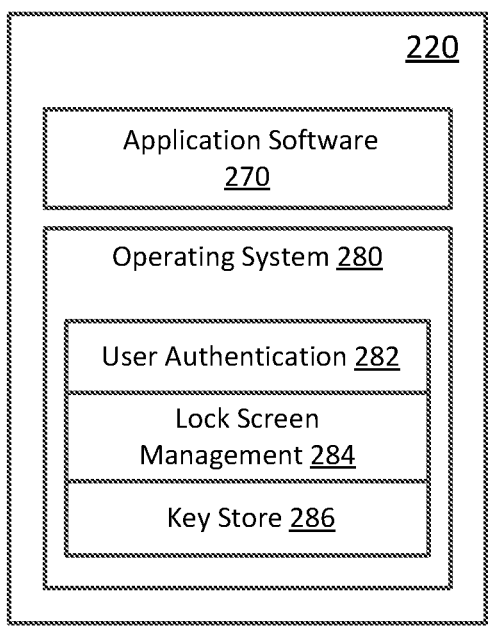
FIG. 2 shows a simplified organization of software components stored in a memory of the computing device of FIG. 1.

FIG. 2 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 2, in operation, the memory 220 may include more than one application software and different application software may perform different operations.

The operating system 280 is software. The operating system 280 allows the application software 270 to access the processor 210, the memory 220, the input interface module 230, the output interface module 240 and the communications module 250. The operating system 280 may, for example, be the IOS operating system, the ANDROID operating system, the LINUX operating system, the MICROSOFT WINDOWS operating system, or the like.

The operating system 280 provides various system services for the example computing device 200. User authentication services 282 includes a suite of services relating to credential enrollments and authentication of device users. For example, user authentication services 282 may include initial enrollment of credentials (e.g., PIN, pattern, password, or the like), credentials management, and processing of authentication tokens. Lock screen management services 284 relate to enabling, disabling, and modifying lock screens on the example computing device 200, and may include graphical user interface (GUI) control, display management, user input processing, and device unlock support. The operating system 280 may further include a key store 286.

The e-commerce platform may be implemented using one or more computing devices, such as the computing device 200.

Figure 3:
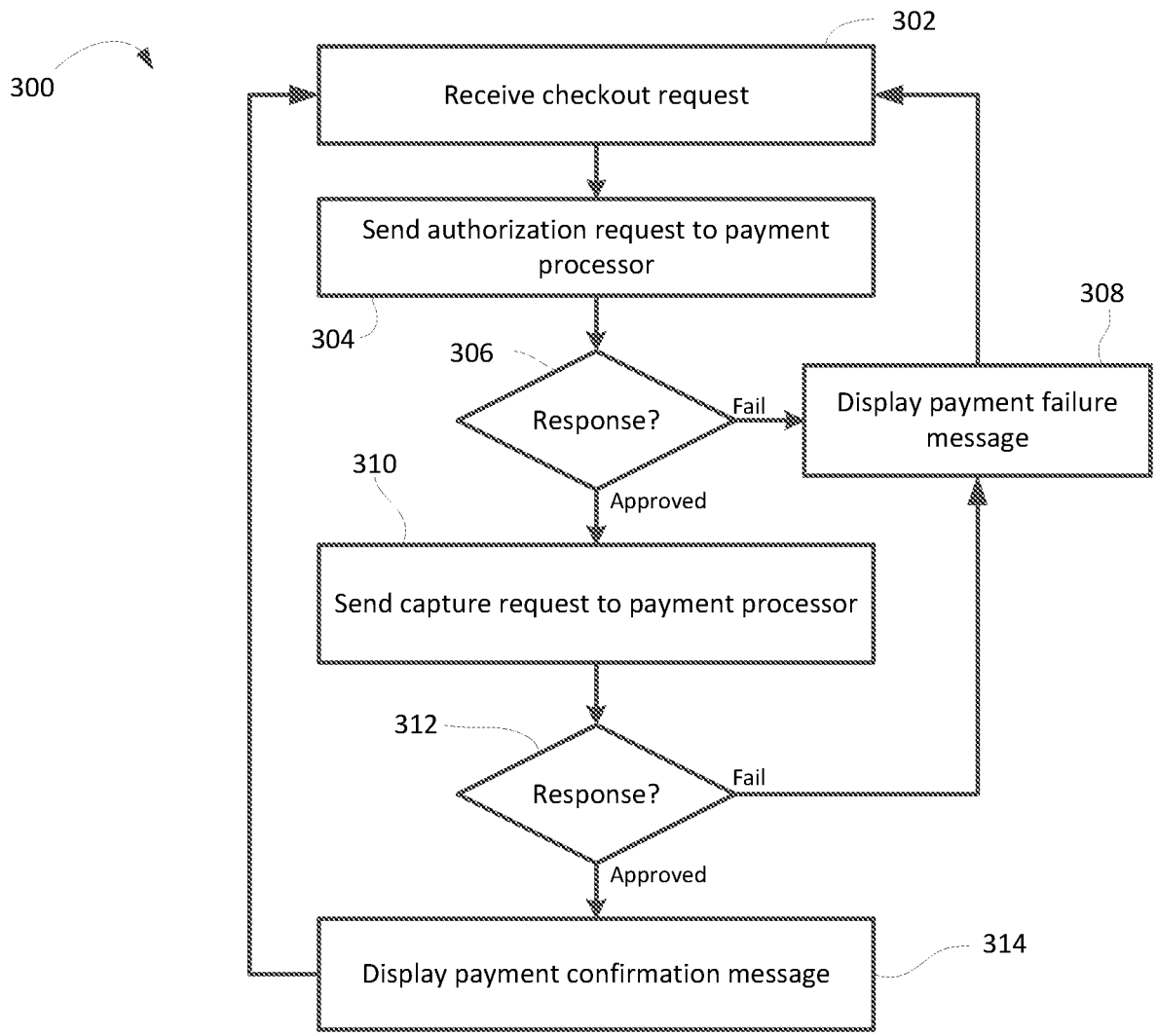
FIG. 3 shows, in flowchart form, an example method of processing a payment using a full checkout process.

Reference is now made to FIG. 3, which shows one example of a simplified method 300 for processing a payment. The method 300 may be implemented by an e-commerce platform and, in particular, may be implemented by way of suitably-programmed software instructions stored in memory on a computing device which, when executed by one or more processors of the computing device, cause the computing device to carry out the described operations.

The method 300 shown is a full checkout process in which both authorization and capture operations are completed before providing payment confirmation. In operation 302, the e-commerce platform receives a checkout request. The checkout request is received in connection with a particular merchant account and a customer that has selected one or more products or services offered by that merchant account. The checkout request is typically received via customer selection of a checkout link, button, or other such element on a GUI displayed on a customer device, which triggers transmission of the checkout request from the customer device to the e-commerce platform. Various other operations may be carried out in connection with the checkout request, such as the input or selection of shipping information, discount codes, payment details, and the like. In some cases, these details are pre-populated the customer GUI display after being retrieved from memory at the e-commerce platform or from the customer device. In some cases, the details are input by the customer via the customer device. The payment details may include a payment type, account number, total payment amount, authentication data, and other such parameters. The specific parameters may vary depending on the payment type, the products/services involved, and the requirements of an associated payment processor, among other things.

The payment processor may be a payment processor designated by the merchant account for processing payments to the merchant. In some cases, the merchant may have more than one payment processor designated. The merchant account may indicate an order of priority in some cases. The payment processors may be specific to certain categories or types of payments. As an example, one payment processor may be designated for handling credit card transactions, a different one may be designated for handling debit transactions, and yet another may be specific to a certain payment type, such as ApplePay™, PayPal™, or the like. In some cases, certain payment processors may be designated for use dependent on the nature of the goods/services or dependent upon the location of the customer making the purchase. The e-commerce platform may use various of these factors in identifying a payment processor for handling of the payment associated with the checkout request received in operation 302.

Once the required payment details are provided and the customer provides a payment confirmation instruction, for example through selection of a "pay now" button or link or the like, then the e-commerce platform sends an authorization request to the payment processor in operation 304. The authorization request may be an API call in a form or format prescribed by the payment processor and may include payment details, including an account identifier, payment amount, and authentication data to enable the payment processor to identify an associated account and/or financial institution involved, and to validate the legitimacy of the payment request. The authorization operation at the payment processor may involve placing a temporary hold on funds in the specified account corresponding to the payment amount. The placing of the hold may be based on communications with a financial institution payment system associated with the account.

Once the authorization operation has been carried out, the e-commerce platform receives a response, as indicated by operation 306. The response may confirm the authorization has been approved or confirmed, or the response may indicate that the authorization failed. The authorization may fail due to insufficient funds, incorrect payment details, or other such errors. In some cases, the authorization may time out or may be refused by the payment processor due to a payment processing limit. If the authorization fails, then in operation 308 the e-commerce platform may cause display of a payment failure message on the GUI of the customer device. Depending on the implementation, the e-commerce platform may provide the customer with the option of changing or correcting payment details, may re-try the payment request, and/or may remove the customer from the checkout process.

If the authorization operation is successful, then in operation 310 the e-commerce platform may transmit a capture request to the payment processor. The capture request may be a capture API call in a form or format prescribed by the payment processor and may include such as a code or identifier corresponding to the approved authorization and other such parameters. The payment processor carries out operations to implement the "capture" operation, i.e. the extending or transfer of funds from the designated account to a merchant account or an intermediate account. This operation typically involves communications with one or more financial institution computing systems to cause the funds to be transferred.

In operation 312, the e-commerce platform determines whether a response has been received from the payment processor. If a failure message (or time-out or other indication of failed capture) is received then the method 300 continues to operation 308 to cause display of the payment failure message. If a capture success message, i.e. a capture confirmation message, is received then in operation 314 the e-commerce platform outputs a payment confirmation message. This may include causing the customer device to display a payment confirmation message, transmitting a payment confirmation message to a customer account, via SMS or email for example, or otherwise communicating the payment success to the customer device.

Figure 4:
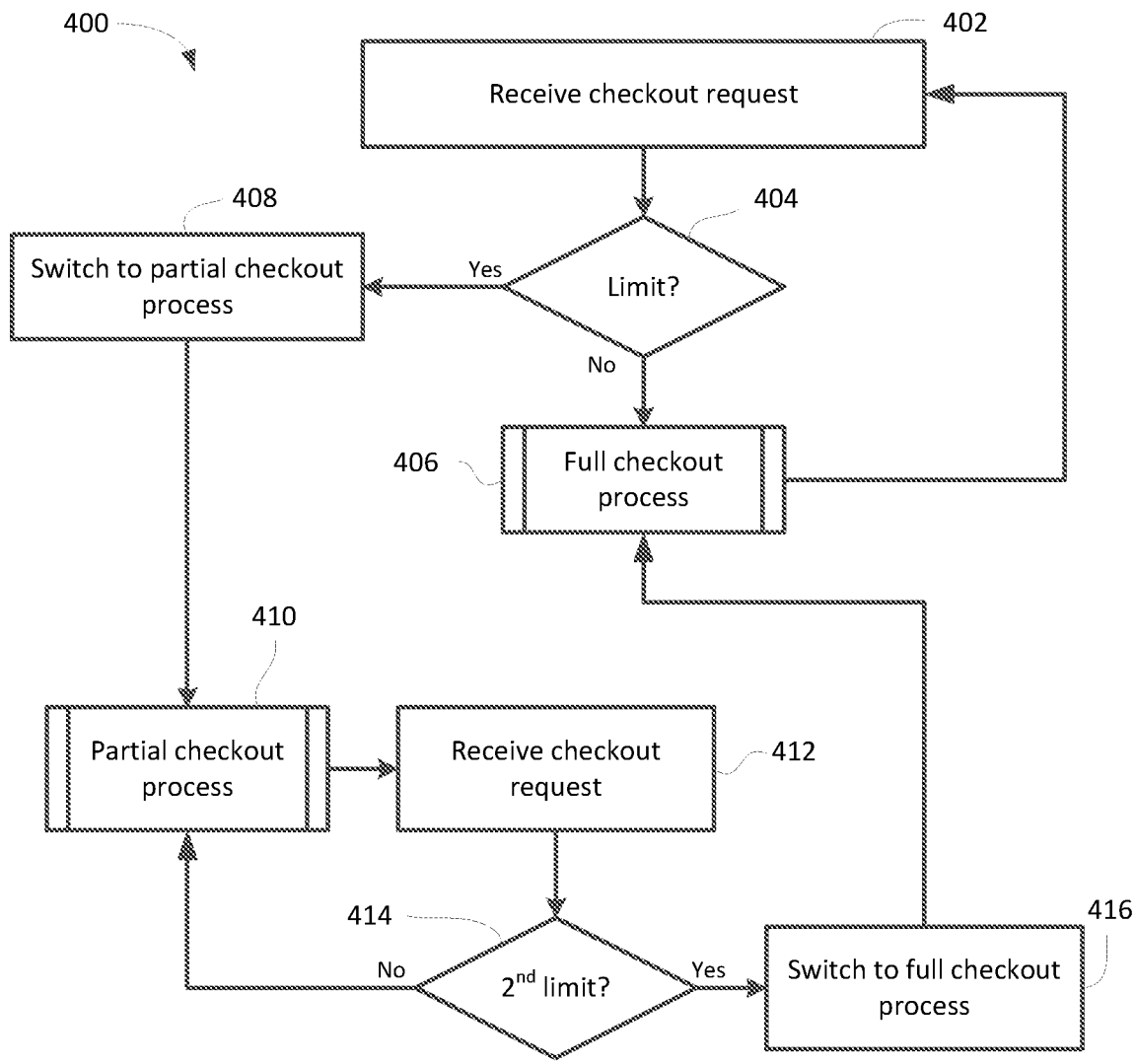
FIG. 4 shows, in flowchart form, an example method of dynamically switching between full and partial checkout processes based on load conditions.

The foregoing method 300 represents the general operations of a typical full checkout process carried out by the e-commerce platform in the normal course. Reference will now be made to FIG. 4, which shows, in flowchart form, one example method 400 for dynamically switching between checkout processes based on load conditions. The method 400 may be implemented by an e-commerce platform and, in particular, may be implemented by way of suitably-programmed software instructions stored in memory on a computing device which, when executed by one or more processors of the computing device, cause the computing device to carry out the described operations.

As with the method 300 (FIG. 3), the method 400 includes the e-commerce platform receiving a checkout request, as indicated by operation 402. As noted above, the checkout request may be received from a customer device and relates to one or more goods or services offered by a merchant account. The checkout request may include receiving payment information and other details for completing the purchase. The e-commerce platform identifies the responsible payment processor for the checkout request.

In operation 404, the e-commerce platform may determine whether a first payment throughput event has been detected. As noted above, the first payment throughput limit event is a condition or event indicative or correlated to a current or predicted throughput limit being reached with regard to the responsible payment processor. The limit may be one set by the payment processor, set by the e-commerce platform, learned by the e-commerce platform from a past history of payment requests with regard to the payment processor, and/or inferred from one or more payment request failures.

In some illustrative examples, the first payment throughput limit event may be detected based on (a) receiving a refusal or failure message with regard to a payment request (e.g. authorization API call or capture API call) due to volume, (b) determining that a current count of payment requests (e.g. authorization operations and/or capture operations) is within a threshold percentage of a maximum volume, (c) determining that a count of shopping carts associated with a merchant account exceeds a maximum threshold, (d) determining that a count of customers in a checkout process or for which a checkout request has been received exceeds a threshold, or (e) determining that a rate of growth in payment request count exceeds a maximum rate of growth. Combinations or sub-combinations of these examples may be used in some implementations.

In some cases, detecting the first payment throughput limit event includes determining a projected rate of checkout requests and determining that the projected rate of checkout requests exceeds a payment processor maximum rate limit. For example, using one or more metrics like those outlined above, the e-commerce platform may determine a rate at which the count of concurrent payment requests is increasing and may project the total count at a future time, such as within 30 second or a minute for instance. In some cases, the e-commerce platform may determine from one or more metrics that the rate of increase is accelerating and may determine a projected future rate of payment requests. Other metrics or measurements for payment request volume or demand may be determined for assessing the likelihood that checkout requests will result in payment request demand that exceeds the first payment throughput limit of a particular payment processor. In some cases, the first payment throughput limit may be based on internal e-commerce platform state metrics, such as number of database connections or request queuing, which may be correlated to potential payment transaction delays or failures.

The various maximum limits may be prescribed by the payment processor, set by the e-commerce platform, or may be based on historical data collected by the e-commerce platform regarding the capacity limit of that payment processor. Limits may be payment processor specific and stored in memory at the e-commerce platform.

If no first payment throughput limit event is detected, then the e-commerce platform remains in "full checkout process" mode and processes the checkout request using a full checkout process, as indicated by operation 406. In some cases, the full checkout process may include the operations described above in connection with FIG. 3. The full checkout process generally includes completing an authorization operation and a capture operation via the payment processor before generating a payment complete notification and ending the checkout process.

If a first payment throughput limit event is detected, then the e-commerce platform may switch to a partial checkout process, as indicated by operation 408. Thereafter, the e-commerce platform applies a partial checkout process to checkout requests, as indicated by operation 410. The partial checkout process includes generating and transmitting an authorization request to the payment processor, but delaying the transmission of a corresponding capture request. The capture request may be queued in memory for later processing. An indication of payment confirmation or payment success may be generated and output by the e-commerce platform after completion of the authorization operation and before initiation of the corresponding capture operation while in a partial checkout process mode.

Although not illustrated separately in FIG. 4, operation 408 may be conditional on determining that the merchant and/or the payment processor have pre-authorized the use of a partial checkout process. That is, the merchant account and/or the payment processor profile stored on the e-commerce platform may include data indicating whether they are eligible and authorized for partial checkout process during high payment demand events. A merchant may be capable of configuring its stored profile to enable or disable the partial checkout process.

As the e-commerce platform continues to receive checkout requests, as indicated by operation 412, it continues to process them using the partial checkout process 410. Whilst doing so, it monitors for detection of a second payment throughput limit event in operation 414. The second payment throughput limit may be detection of a condition or parameter indicative of sufficient processing capacity at the payment processor to resume full checkout processing. The second payment throughput limit event may be based on the same metric or parameter as the first payment throughput limit event, but using a lower threshold, in some cases. The second payment throughput limit event may be based on a different metric or parameter from the first payment throughput limit event in some cases.

If the second payment throughput limit event is detected in operation 414, then in operation 416 the e-commerce platform switches back to full checkout processing mode and proceeds to operation 406 to apply the full checkout process to subsequent checkout requests.

Operation 416 further includes sending the queued capture operation requests to the payment processor for processing. In one example, they may be sent immediately upon switching back to full checkout processing. In some examples, they may be sent in order at a controlled rate to avoid overwhelming the payment processor. In some examples, as will be described later below, a separate test may be applied for determining when to transmit the enqueued capture requests to the payment processor. In some instances, the queued capture operations may include more than one capture operation referencing the same payment credentials, e.g. if the same customer uses the same credit card on more than one transaction and both capture operations from those transactions have been queued. In those circumstances, the payment process may complete both transactions using a single capture operation for the aggregate amount.

Figure 5:
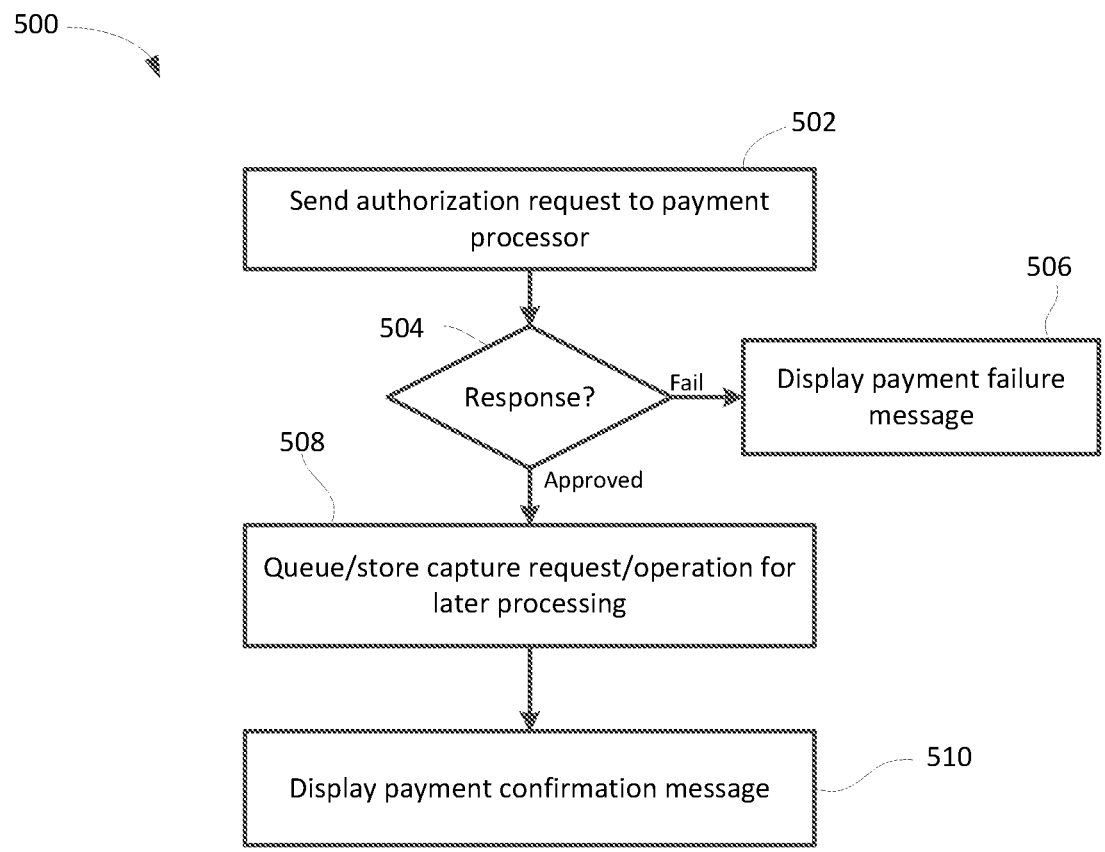
FIG. 5 shows, in flowchart form, an example of a partial checkout process.

Reference is now made to FIG. 5, which shows one example of a partial checkout process 500. The process 500 may be implemented by an e-commerce platform and, in particular, may be implemented by way of suitably-programmed software instructions stored in memory on a computing device which, when executed by one or more processors of the computing device, cause the computing device to carry out the described operations.

In this example, the process 500 presumes that the e-commerce system has received a checkout request and is operating in partial checkout mode due to detection of the first payment throughput limit event with regard to the responsible payment processor.

In operation 502, the e-commerce platform sends an authorization request to the payment processor. The authorization request may be an API call in a form or format prescribed by the payment processor and may include payment details, including an account identifier, payment amount, and authentication data to enable the payment processor to identify an associated account and/or financial institution involved, and to validate the legitimacy of the payment request. The authorization operation at the payment processor may involve placing a temporary hold on funds in the specified account corresponding to the payment amount. The placing of the hold may be based on communications with a financial institution payment system associated with the account.

Once the authorization operation has been carried out, the e-commerce platform receives a response, as indicated by operation 504. The response may confirm the authorization has been approved or confirmed, or the response may indicate that the authorization failed. The authorization may fail due to insufficient funds, incorrect payment details, or other such errors. In some cases, the authorization may time out or may be refused by the payment processor due to a payment processing limit. If the authorization fails, then in operation 506 the e-commerce platform may cause display of a payment failure message on the GUI of the customer device. Depending on the implementation, the e-commerce platform may provide the customer with the option of changing or correcting payment details, may re-try the payment request, and/or may remove the customer from the checkout process. In many implementations, when the reason for failure is insufficient funds, incorrect credentials, or the like, then a failure message will be displayed and the customer invited to correct the errors; whereas when the reason for failure is a payment processing limit the authorization will be re-tried.

If the authorization operation is successful, then in operation 508 the e-commerce platform queues the capture operation for later execution. This may include saving payment details and details regarding the authorization response to memory. The authorization details may include data such as an authorization code or a copy of the authorization response message provided by the payment processor. The data saved is data sufficient to enable the e-commerce system to later generate and send a capture operation request to the payment processor with regard to the specific purchase involved. The e-commerce platform may have a dedicated portion of memory allocated for storing a set of queued capture requests.

In operation 510, the e-commerce platform provides confirmation of purchase completion, prior to sending the corresponding capture request to the payment processor. The confirmation may include causing the customer device to display a GUI page indicating payment completion, transmitting a payment confirmation message to a contact address associated with the customer device, or otherwise communicating to the customer device that the checkout process was successfully completed. The e-commerce platform may further remove the customer from the checkout process or queue.

Figure 6:
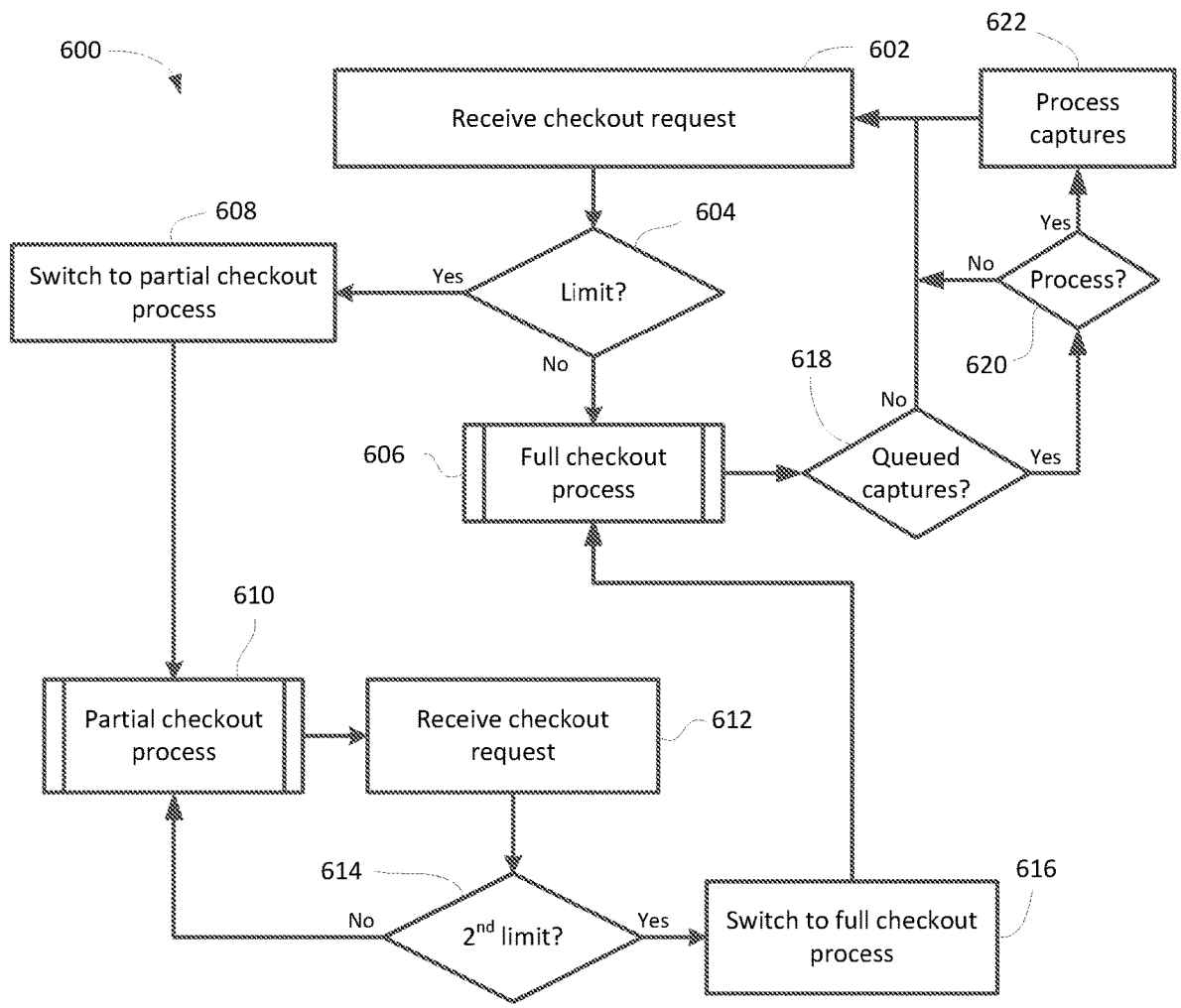
FIG. 6 shows, in flowchart form, another example method of dynamically switching between full and partial checkout processes based on load conditions.

Reference is now made to FIG. 6, which shows, in flowchart form, another example method 600 for dynamically switching between checkout processes based on load conditions. The method 600 may be implemented by an e-commerce platform and, in particular, may be implemented by way of suitably-programmed software instructions stored in memory on a computing device which, when executed by one or more processors of the computing device, cause the computing device to carry out the described operations. The example method 400 features separate tests for determining when to switch from partial checkout back to the full checkout process and for determining when to process queued capture requests.

The method 600 includes the e-commerce platform receiving a checkout request in operation 602. As noted above, the checkout request may be received from a customer device and relates to one or more goods or services offered by a merchant account. The checkout request may include receiving payment information and other details for completing the purchase. The e-commerce platform identifies the responsible payment processor for the checkout request.

In operation 604, the e-commerce platform may determine whether a first payment throughput event has been detected. As noted above, the first payment through limit event is a condition or event indicative or correlated to a current or predicted throughput limit being reached with regard to the responsible payment processor. The limit may be one set by the payment processor, set by the e-commerce platform, learned by the e-commerce platform from a past history of payment requests with regard to the payment processor, and/or inferred from one or more payment request failures.

In some illustrative examples, the first payment throughput limit event may be detected based on (a) receiving a refusal or failure message with regard to a payment request (e.g. authorization API call or capture API call) due to volume, (b) determining that a current count of payment requests (e.g. authorization operations and/or capture operations) is within a threshold percentage of a maximum volume, (c) determining that a count of shopping carts (e.g. active customers having selected at least one item) associated with a merchant account exceeds a maximum threshold, (d) determining that a count of customers in a checkout process or for which a checkout request has been received exceeds a threshold, or (e) determining that a rate of growth in payment request count exceeds a maximum rate of growth. Combinations or sub-combinations of these examples may be used in some implementations.

In some cases, detecting the first payment throughput limit event includes determining a projected rate of checkout requests and determining that the projected rate of checkout requests exceeds a payment processor maximum rate limit. For example, using one or more metrics like those outlined above, the e-commerce platform may determine a rate at which the count of concurrent payment requests is increasing and may project the total count at a future time, such as within 30 seconds or a minute for instance. In some cases, the e-commerce platform may determine from one or more metrics that the rate of increase is accelerating and may determine a projected future rate of payment requests. Other metrics or measurements for payment request volume or demand may be determined for assessing the likelihood that checkout requests will result in payment request demand that exceeds the first payment throughput limit of a particular payment processor.

The various maximum limits may be prescribed by the payment processor, set by the e-commerce platform, or may be based on historical data collected by the e-commerce platform regarding the capacity limit of that payment processor. Limits may be payment processor specific and stored in memory at the e-commerce platform.

If no first payment throughput limit event is detected, then the e-commerce platform remains in "full checkout process" mode and processes the checkout request using a full checkout process, as indicated by operation 606. In some cases, the full checkout process may include the operations described above in connection with FIG. 3. The full checkout process generally includes completing an authorization operation and a capture operation via the payment processor before generating a payment complete notification and ending the checkout process.

If a first payment throughput limit event is detected, then the e-commerce platform may switch to a partial checkout process, as indicated by operation 608. Thereafter, the e-commerce platform applies a partial checkout process to checkout requests, as indicated by operation 610. The partial checkout process includes generating and transmitting an authorization request to the payment processor, but delaying the transmission of a corresponding capture request. The capture request may be queued in memory for later processing. An indication of payment confirmation or payment success may be generated and output by the e-commerce platform after completion of the authorization operation and before initiation of the corresponding capture operation while in a partial checkout process mode. An example of the partial checkout process is detailed above in connection with FIG. 5.

As the e-commerce platform continues to receive checkout requests, as indicated by operation 612, it continues to process them using the partial checkout process 610. Whilst doing so, it monitors for detection of a second payment throughput limit event in operation 614. The second payment throughput limit may be detection of a state, condition or parameter indicative of sufficient processing capacity at the payment processor to resume full checkout processing. The second payment throughput limit event may be based on the same metric or parameter as the first payment throughput limit event, but using a lower threshold, in some cases. The second payment throughput limit event may be based on a different metric or parameter from the first payment throughput limit event in some cases.

If the second payment throughput limit event is detected in operation 614, then in operation 616 the e-commerce platform switches back to full checkout processing mode and proceeds to operation 606 to apply the full checkout process to subsequent checkout requests.

Once the e-commerce platform returns to full checkout mode, if there are queued capture requests resulting from use of partial checkout mode, as indicated by operation 618, then the e-commerce platform determines whether to process those queued capture requests in operation 620. The determination of whether to process the queued capture requests may be based on detecting a third payment throughput limit event, which may be different from the first and second payment throughput limit events. For example, it may be based on the same or a similar parameter but at a lower threshold than used in either the first or second payment throughput limit events, indicative of even more excess capacity at the payment processor. In some cases, it may be based on a different parameter than that used in either the first or second payment throughput limit events.

The determination may be based on detecting the end of the flash sale. The end of the flash sale may be detected based on a scheduled end time for the event in some cases. It may also be inferred based on detecting a below threshold count of shopping carts, of active customers browsing the merchant, of checkout requests, of customers in the checkout phase, or of other such parameters indicative of a drop in activity below flash sale conditions. In one example, the end of the flash sale is inferred from a count of polling users awaiting access to a checkout phase dropping below a threshold level. If the number of polling users is below the threshold level for at least a minimum duration, then the flash sale may be inferred to have ended. The threshold may be set based on payment processor capacity or throughput limits. Other such metrics or parameters may be used to identify when the payment processor is likely to have sufficient capacity to process the queued capture requests.

If the e-commerce platform determines that the load conditions at the e-commerce platform with regard to the payment processor are sufficiently low, then in operation 622 it triggers processing of the queued capture requests. This may include generating and sending to the payment processor an API call with regard to each queued capture request, to trigger a capture operation at the payment processor with regard to that payment transaction. The API calls may be generated and sent immediately or may be sent at a controlled rate to avoid overwhelming the payment processor if there are a sufficiently large number of queued capture requests.

In any of the above-described example methods or processes it will be understood that certain operations described as occurring in sequence may be implemented in a different sequence or carried out in parallel without impacting the overall functioning of the method or process.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
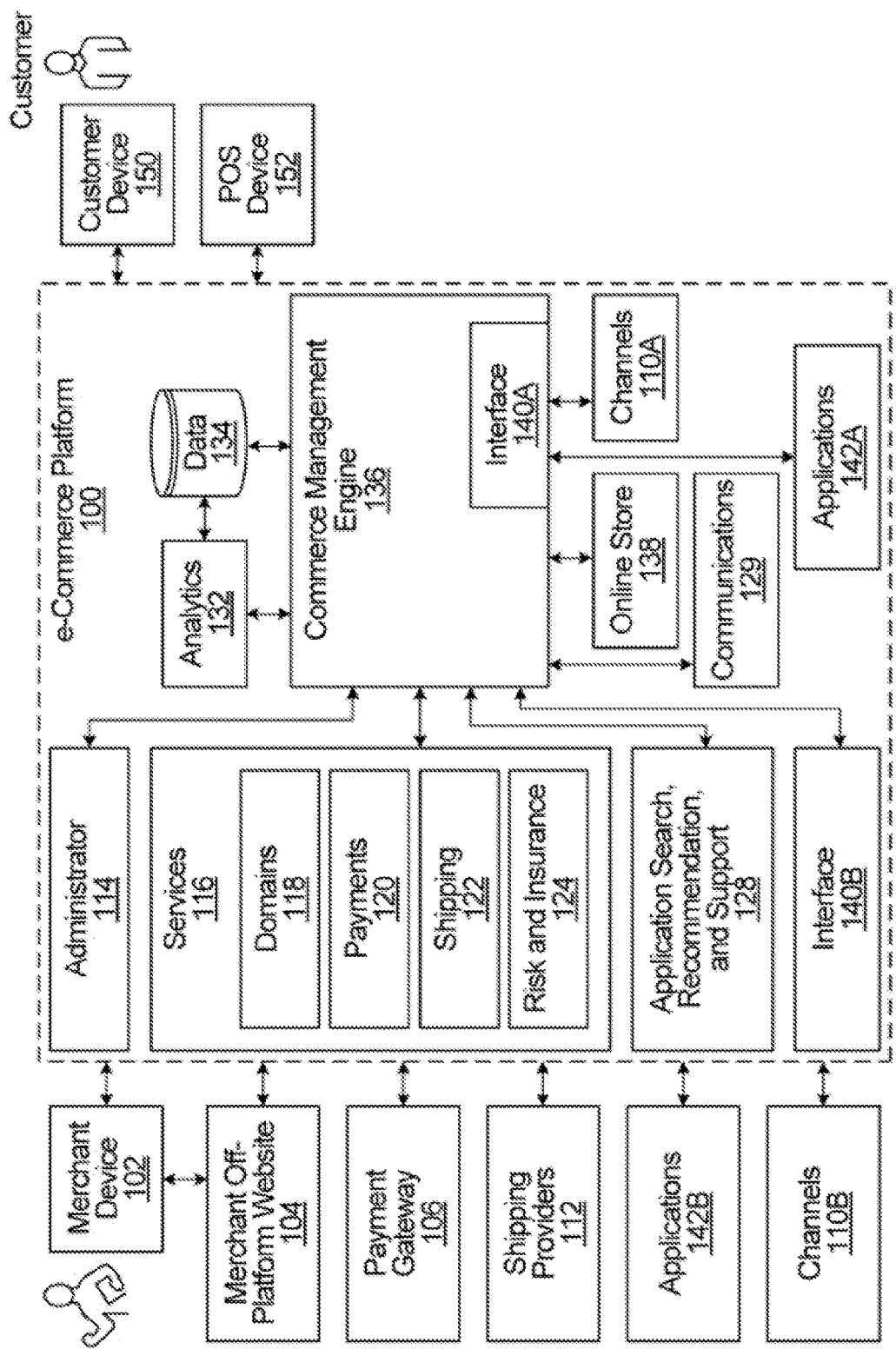
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce platform 105 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152. In particular, the POS devices 152 associated with the e-commerce platform 100 may be configured to implement any one or more of the example methods 300 to 600 described above with reference to FIGS. 3 to 6.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other Internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. The e-commerce platform 100 may further provide analytics 132. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
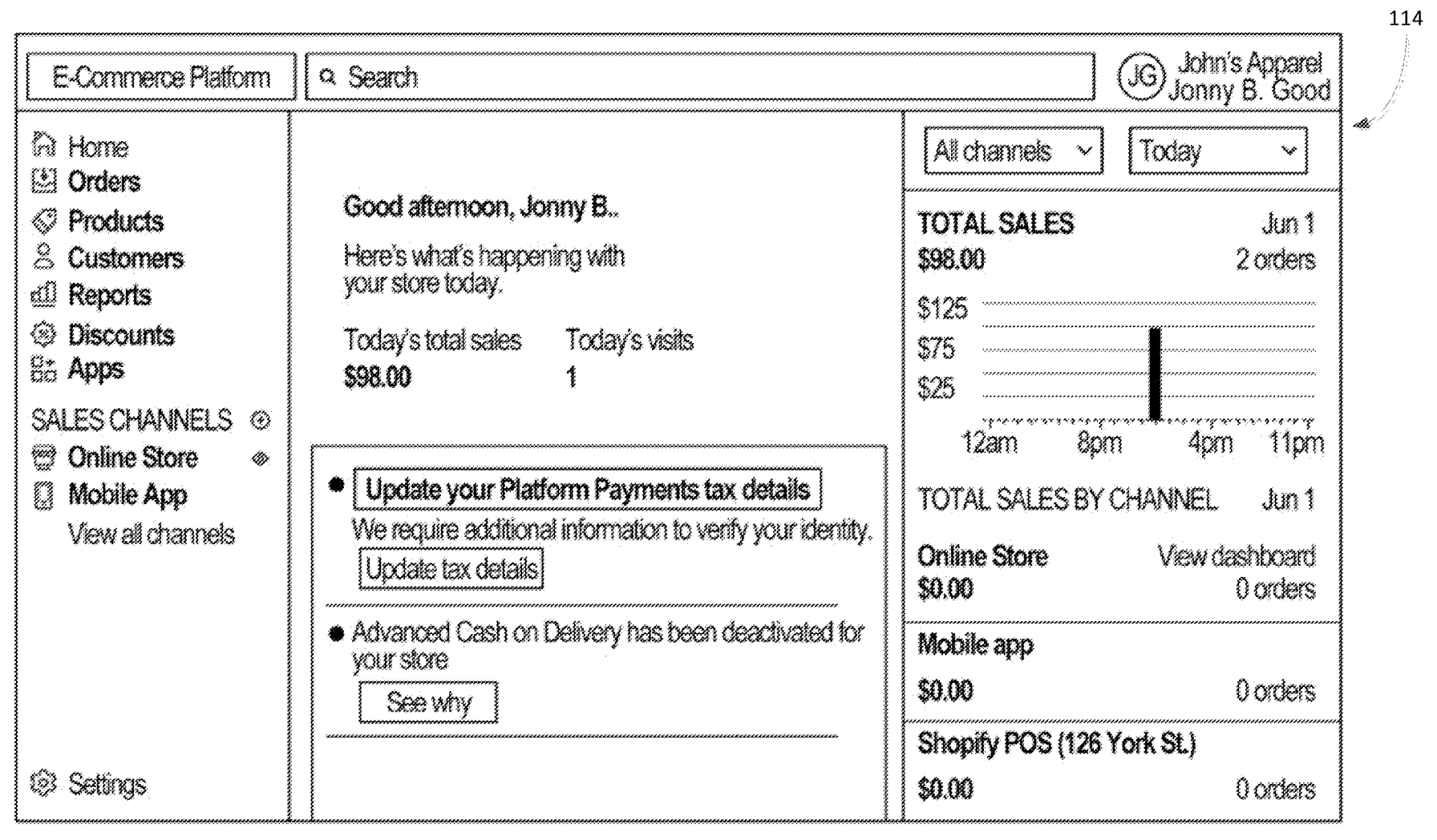

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving checkout requests in connection with a merchant account;
completing, for each of at least one of the checkout requests, an authorization operation and a capture operation via a payment processor;
measuring a congestion metric correlated to capacity of the payment processor to process payment requests and detecting a first payment throughput limit event with regard to the payment processor based on the congestion metric exceeding a first threshold;
responsive to the first payment throughput limit event, completing a respective authorization operation for each new checkout request, and delaying a respective capture operation for the new checkout request until after a second payment throughput limit event is detected; and,
detecting the second payment throughput limit event based on the congestion metric being below a second threshold set lower than the first threshold and, responsive to the second payment throughput limit event:
completing authorization and capture operations for each subsequent checkout request received, and
completing the delayed respective capture operations,
wherein the congestion metric includes a merchant-specific congestion metric correlated to capacity of the payment processor to process payment requests relating to the merchant account, and the first threshold is a merchant-specific first threshold associated with the merchant account.

2. The method of claim 1, wherein completing the authorization operation and the capture operation via the payment processor comprises completing a full checkout process, and wherein completing the respective authorization operation and delaying the respective capture operation comprises completing a partial checkout process.

3. The method of claim 1, wherein the congestion metric includes a projected rate of checkout requests and the first threshold includes a payment processor maximum rate, and wherein detecting the first payment throughput limit event includes determining that the projected rate of checkout requests exceeds the payment processor maximum rate.

4. The method of claim 1, wherein the congestion metric includes at least one of:
a count of checkout requests received,
a count of purchasers in a checkout phase,
a count of authorization operations, a count of capture operations,
a count of shopping carts associated with the merchant account,
a rate of new purchasers entering the checkout phase, or
a rate of growth in payment request volume with regard to the merchant account.

5. The method of claim 4, further comprising determining the first threshold based on a stored history of measured checkout request rates during receipt of one or more payment failure messages from the payment processor.

6. The method of claim 1, wherein completing the respective authorization operation includes causing a customer device to display a payment completion message in response to completion of the respective authorization operation and prior to completion of the respective capture operation.

7. The method of claim 1, wherein completing the authorization operation and the capture operation, prior to detecting the first payment throughput limit event, comprises:
sending an authorization request to the payment processor;
receiving an authorization approval message from the payment processor;
sending a capture request message to the payment processor after receipt of the authorization approval message; and
receiving a capture approval message from the payment processor.

8. The method of claim 7, wherein completing the authorization operation and the capture operation, prior to detecting the first payment throughput limit event, further includes:
responsive to receipt of the capture approval message, causing a respective customer device to display a payment completion message.

9. The method of claim 1, wherein the method further includes determining that stored merchant data associated with the merchant account includes a partial checkout process authorization as a condition prior to delaying a respective capture operation for the new checkout request.

10. A computing device, comprising:
a processor; and
a memory coupled to the processor, the memory storing instructions that, when executed by the processor, are to cause the processor to:
receive checkout requests in connection with a merchant account;
complete, for each of at least one of the checkout requests, an authorization operation and a capture operation via a payment processor;
measure a congestion metric correlated to capacity of the payment processor to process payment requests and detect a first payment throughput limit event with regard to the payment processor based on the congestion metric exceeding a first threshold;
responsive to the first payment throughput limit event, complete a respective authorization operation for each new checkout request, and delay a respective capture operation for the new checkout request until after a second payment throughput limit event is detected; and,
detect the second payment throughput limit event based on the congestion metric being below a second threshold set lower than the first threshold and, responsive to the second payment throughput limit event:
complete authorization and capture operations for each subsequent checkout request received, and
complete the delayed respective capture operation,
wherein the congestion metric includes a merchant-specific congestion metric correlated to capacity of the payment processor to process payment requests relating to the merchant account, and the first threshold is a merchant-specific first threshold associated with the merchant account.

11. The method of claim 1, wherein the merchant-specific congestion metric includes a rate of checkout requests per minute in association with the merchant account and wherein the merchant-specific first threshold is a maximum rate of checkout requests permitted for that merchant account by the payment processor.

12. The computing device of claim 10, wherein the instructions, when executed, are to cause the processor:
to complete the authorization operation and the capture operation via the payment processor by completing a full checkout process; and
to complete the respective authorization operation and delaying the respective capture operation by completing a partial checkout process.

13. The computing device of claim 10, the congestion metric includes a projected rate of checkout requests and the first threshold includes a payment processor maximum rate, and wherein the instructions, when executed, are to cause the processor to detect the first payment throughput limit event by determining that the projected rate of checkout requests exceeds the payment processor maximum rate.

14. The computing device of claim 10, wherein the congestion metric includes at least one of:
a count of checkout requests received,
a count of purchasers in a checkout phase,
a count of authorization operations, a count of capture operations,
a count of shopping carts associated with the merchant account,
a rate of new purchasers entering the checkout phase, or
a rate of growth in payment request volume with regard to the merchant account.

15. The computing device of claim 14, wherein the instructions, when executed, are to further cause the processor to determine the first threshold based on a stored history of measured checkout request rates during receipt of one or more payment failure messages from the payment processor.

16. The computing device of claim 10, wherein the instructions, when executed, are to cause the processor to complete the respective authorization operation by causing a customer device to display a payment completion message in response to completion of the respective authorization operation and prior to completion of the respective capture operation.

17. The computing device of claim 10, wherein the instructions, when executed, are to cause the processor to complete the authorization operation and the capture operation, prior to detecting the first payment throughput limit event, by:
sending an authorization request to the payment processor;
receiving an authorization approval message from the payment processor;
sending a capture request message to the payment processor after receipt of the authorization approval message; and
receiving a capture approval message from the payment processor.

18. The computing device of claim 17, wherein the instructions, when executed, are to cause the processor to complete the authorization operation and the capture operation, prior to detecting the first payment throughput limit event, by:
further causing a respective customer device to display a payment completion message.

19. The computing device of claim 10, wherein the instructions, when executed, are to further cause the processor to determine that stored merchant data associated with the merchant account includes a partial checkout process authorization as a condition prior to delaying a respective capture operation for the new checkout request.

20. The computing device of claim 10, wherein the merchant-specific congestion metric includes a rate of checkout requests per minute in association with the merchant account and wherein the merchant-specific first threshold is a maximum rate of checkout requests permitted for that merchant account by the payment processor.

21. A non-transitory, computer-readable medium storing computer-executable instructions that, when executed by a processor, are to cause the processor to:
receive checkout requests in connection with a merchant account;
complete, for each of at least one of the checkout requests, an authorization operation and a capture operation via a payment processor;
measure a congestion metric correlated to capacity of the payment processor to process payment requests and detect a first payment throughput limit event with regard to the payment processor based on the congestion metric exceeding a first threshold;
responsive to the first payment throughput limit event, complete a respective authorization operation for each new checkout request, and delay a respective capture operation for the new checkout request until after a second payment throughput limit event is detected; and,
detect the second payment throughput limit event based on the congestion metric being below a second threshold set lower than the first threshold and, responsive to the second payment throughput limit event:
complete authorization and capture operations for each subsequent checkout request received, and
complete the delayed respective capture operations,
wherein the congestion metric includes a merchant-specific congestion metric correlated to capacity of the payment processor to process payment requests relating to the merchant account, and the first threshold is a merchant-specific first threshold associated with the merchant account.

22. The non-transitory, computer-readable medium of claim 21, wherein the congestion metric includes a projected rate of checkout requests and the first threshold includes a payment processor maximum rate, and wherein the instructions, when executed, are to cause the processor to detect the first payment throughput limit event by determining that the projected rate of checkout requests exceeds the payment processor maximum rate.

23. The non-transitory, computer-readable medium of claim 21, wherein the merchant-specific congestion metric includes a rate of checkout requests per minute in association with the merchant account and wherein the merchant-specific first threshold is a maximum rate of checkout requests permitted for that merchant account by the payment processor.

* * * * *